(12) United States Patent
Wood, Jr. et al.

(10) Patent No.: US 7,413,800 B2
(45) Date of Patent: Aug. 19, 2008

(54) CO-EXTRUDED BIAXIALLY ORIENTED SEALABLE, PEELABLE FILM AND PROCESS FOR ITS PRODUCTION

(75) Inventors: Ronald C. Wood, Jr., Pittsford, NY (US); Marcos Fernandes Vieira, Boa Viagem Recife-PE (BR)

(73) Assignee: Terphane Inc., Bloomfield, NY (US)

( * ) Notice: Subject to any disclaimer, the term of this patent is extended or adjusted under 35 U.S.C. 154(b) by 483 days.

(21) Appl. No.: 10/951,333

(22) Filed: Sep. 27, 2004

(65) Prior Publication Data

US 2005/0208282 A1    Sep. 22, 2005

Related U.S. Application Data

(60) Provisional application No. 60/555,346, filed on Mar. 22, 2004.

(51) Int. Cl.
| B32B 27/08 | (2006.01) |
| B32B 27/20 | (2006.01) |
| B32B 27/30 | (2006.01) |
| B32B 27/32 | (2006.01) |
| B32B 27/36 | (2006.01) |

(52) U.S. Cl. .................. 428/331; 428/213; 428/214; 428/215; 428/216; 428/323; 428/333; 428/334; 428/335; 428/336; 428/339; 428/346; 428/347; 428/349; 428/480; 428/483

(58) Field of Classification Search ............ None
See application file for complete search history.

(56) References Cited

U.S. PATENT DOCUMENTS

| 3,879,492 | A | * | 4/1975 | Botinick ............... 523/100 |
| 4,279,344 | A | * | 7/1981 | Holloway, Jr. ......... 229/123.1 |
| 4,375,494 | A | * | 3/1983 | Stokes ................. 428/323 |
| 4,469,754 | A | | 9/1984 | Hoh et al. |
| 4,476,189 | A | * | 10/1984 | Posey et al. .............. 428/336 |
| 4,521,467 | A | * | 6/1985 | Berger .................. 428/40.6 |
| 4,705,707 | A | * | 11/1987 | Winter ................... 428/34.3 |
| 4,716,061 | A | | 12/1987 | Winter |
| 4,765,999 | A | * | 8/1988 | Winter ................... 426/113 |
| 4,859,514 | A | * | 8/1989 | Friedrich et al. .......... 428/36.6 |
| 4,946,743 | A | | 8/1990 | Winter |
| 5,059,470 | A | | 10/1991 | Fukuda et al. |
| 5,126,176 | A | * | 6/1992 | Blaskovitz et al. ....... 428/36.92 |
| 5,156,904 | A | | 10/1992 | Rice |
| 5,328,755 | A | * | 7/1994 | Mills et al. .............. 428/215 |
| 5,437,911 | A | * | 8/1995 | Rohrka et al. ........... 428/195.1 |
| 5,458,965 | A | * | 10/1995 | Yoshinaka et al. ......... 428/323 |

(Continued)

OTHER PUBLICATIONS

Schimtz, Peter et al., "Films." Ullmann's Encyclopedia of Industrial Chemistry, 5th Ed., vol. A11 (1988), pp. 85-95, 105-106, 108-110.*
RD 360044 A, Apr. 1994.*

*Primary Examiner*—Vivian Chen
(74) *Attorney, Agent, or Firm*—Jonathan Myers; Andrew Wilford (57) ABSTRACT

A peelable sealable co-extruded film, comprising:
  i. a skin layer capable of heat sealing against a rim of a container, to itself, or to another film and adapted to be peeled there from and comprising a hot melt adhesive resin; and
  ii. a core layer underlying said skin layer and comprising crystalline homopolymer polyethylene terephthalate; and a method for the preparation thereof.

24 Claims, 4 Drawing Sheets

U.S. PATENT DOCUMENTS

| | | | |
|---|---|---|---|
| 5,776,592 A * | 7/1998 | Benhayoun et al. | 428/221 |
| 5,837,358 A | 11/1998 | Bauer et al. | |
| 5,858,543 A * | 1/1999 | Futter et al. | 428/447 |
| 5,888,599 A | 3/1999 | Bradt | |
| 5,888,648 A * | 3/1999 | Donovan et al. | 428/349 |
| 5,955,181 A | 9/1999 | Peiffer et al. | |
| 5,958,531 A | 9/1999 | Stevenson | |
| 6,274,228 B1 | 8/2001 | Ramesh et al. | |
| 6,294,264 B1 | 9/2001 | Piper et al. | |
| 6,326,068 B1 * | 12/2001 | Kong et al. | 428/35.2 |
| 6,358,622 B1 * | 3/2002 | Shida et al. | 428/500 |
| 6,420,004 B1 * | 7/2002 | Veyrat et al. | 428/36.6 |
| 6,500,505 B2 | 12/2002 | Piper et al. | |
| 6,503,549 B1 | 1/2003 | Mueller | |
| 6,537,632 B1 | 3/2003 | Klepsch | |
| 6,551,674 B2 | 4/2003 | Piper et al. | |
| 6,562,443 B1 | 5/2003 | Espinel et al. | |
| 6,602,609 B1 | 8/2003 | Kong | |
| 6,607,823 B2 | 8/2003 | Posey et al. | |
| 6,610,392 B1 | 8/2003 | Ramesh et al. | |
| 6,616,998 B2 * | 9/2003 | Greer et al. | 428/36.6 |
| 6,623,821 B1 | 9/2003 | Kendig | |
| 6,623,866 B2 | 9/2003 | Migliorini et al. | |
| 6,627,273 B2 * | 9/2003 | Wolf et al. | 428/34.9 |
| 6,627,283 B1 | 9/2003 | Freedman | |
| 6,627,295 B2 | 9/2003 | Peiffer et al. | |
| 6,706,389 B1 * | 3/2004 | Bates et al. | 428/349 |
| 6,770,361 B2 | 8/2004 | Kong | |
| 6,887,540 B2 * | 5/2005 | Inoue | 428/35.2 |
| 6,939,584 B2 * | 9/2005 | Sankey et al. | 427/393.5 |
| 2002/0150751 A1 * | 10/2002 | Murschall et al. | 428/331 |
| 2003/0059593 A1 * | 3/2003 | Sakaguchi et al. | 428/216 |
| 2004/0213966 A1 * | 10/2004 | Peiffer et al. | 428/202 |

* cited by examiner

CO-EXTRUDED BIAXIALLY ORIENTED SEALABLE, PEELABLE FILM AND PROCESS FOR ITS PRODUCTION

CROSS REFERENCE TO RELATED APPLICATION

This application claims the benefit of the filing date of 22 Mar. 2004 of Applicants' Provisional Application 60/555,346.

FIELD OF THE INVENTION

This application relates to a new co-extruded film for lidding and for packaging applications and to a process for producing the film.

BACKGROUND OF THE INVENTION

Peelable, sealable films used for lidding and packaging frozen or refrigerated meals, pizzas and other frozen, refrigerated or room-temperature-stored foods are known in the art. See U.S. Pat. No. 6,616,998 B2 assigned to Eastman Chemical Company and U.S. Pat. No. 5,888,599 assigned to DuPont. These films are prepared by a costly, multi-step process in which a core film is first prepared comprising a base layer which is then coated with a hot melt adhesive in a separate step to form a skin. Other sealable films known in the art are coextruded. While these coextruded films are cost-effective to produce, the films obtained are not truly peelable as they often tear and split when removed from the package, often sticking to the food, especially to foods that contain sauces and cheese such as pizza.

OBJECTS OF THE INVENTION

It is an object of the invention to provide a cost-effective peelable, sealable film used for lidding and packaging in which the film is prepared using a single step co-extrusion process.

It is a further object of the invention to provide a peelable, sealable film that allows direct contact with food under storage, either frozen, refrigerated, or at room temperature, or when heating or cooking in a microwave or a conventional oven.

It is a further object of the invention to provide a peelable, sealable film whose skin layer may be in direct contact with the food during storage or when heating or cooking that may be removed from the food without tearing or splitting and without sticking to the food.

SUMMARY OF THE INVENTION

We have discovered a co-extruded, biaxially oriented, peelable, sealable film used for lidding and packaging applications especially for the food industry. The film comprises two or more layers: one layer is a heat seal layer or skin layer comprising a hot melt adhesive resin. The preferred adhesive resins include polymers selected from the group consisting of amorphous polyethylene terephthalate copolymers (PET copolymers), ethylene polyvinyl acetate copolymers (EVA copolymers), polyethylene homopolymer or copolymers cyclic olefin copolymers and blends thereof that may or may not be modified with the addition of:

organic or inorganic particulates such as but not limited to amorphous silica, calcium carbonate, clay, polydimethylsiloxane, or glass beads or mixtures of two or more of these ingredients;

slip agents such as but not limited to a fatty amide: erucamide, stearamide, behenamide, or bisamides (e.g. stearyl-erucamide), silicone oil, mixtures of same;

anti-fog agents such as, but not limited to glycerol monostearate; and anti-static agents such as, but not limited to glycerol monostearate.

The skin layer provides the film with the ability to be heat-sealed to itself or to other films, sheets, or trays made from crystallized polyethylene terephthalate (CPET), amorphous polyethylene terephthalate (APET), foil, PET-coated paperboard, PVC, PS, or polyolefins at temperatures ranging from 50 to 200°C. The skin layer can be formulated to provide either a film destruct bond, or preferably a peelable bond to the other material. Said layer is preferably formulated to allow direct contact with food under storage either frozen, refrigerated or at room temperature or when heating or cooking in a microwave or in a conventional oven. The skin layer is preferably formulated to prevent food from sticking to the film.

The preferred formulation for the skin layer resin is a blend of two amorphous polyethylene terephthalate resins plus 1% stearyl erucamide, 1% behenamide and 1% amorphous silica with a mean particle size of 2μ. This formulation is commercially known as VITEL 1918 and is a proprietary resin formulation produced by Bostik Findley. Another amorphous polyethylene terephthalate formulation suitable to prepare the skin layer resin is VITEL 1912 commercially available from Bostik Findley. Yet another suitable amorphous polyethylene terephthalate formulation from Eastman Chemical is a polyethylene terephthalate copolyester containing 31 mole % 1,4-cyclohexanedimethanol (I.V.O. 76) and 5 weight percent of a random ethylene/methyl acrylate/glycidyl methacrylate terpolymer at 69.25 wt %, 23.5 wt. % and 7.25 wt. % respectively, disclosed in Example 1 of U.S. Pat. No. 6,616,998 B2.

Where the hot melt adhesive resin is a polyethylene terephthalate copolymer blend (including VITEL 1912 and VITEL 1918), its representative physical properties may be as follows:

| Acid Number | <5 |
|---|---|
| Hydroxyl Number | <10 |
| Intrinsic Viscosity (dl/g) | 0.7 to 1.0 |
| DSC Melt Point (degrees C.) | 135 to 155 |
| Thermocell Viscosity (cps) | 250,000 to 350,000 at 190°C. |

When the hot melt adhesive resin is an EVA copolymer blend, the resin may comprise:
65 to 85% ethylene-vinyl acetate copolymer,
10 to 30% paraffin wax
5 to 10% petroleum wax
Viscosity at 150° C. 200,000 to 260,000 cp.

When the hot melt adhesive is a polyethylene homopolymer and copolymer blend, the density of the material preferably ranges from 0.90 to 0.92 g/cc and the melt index ranges from 6 to 8 g/10 min.

The films further comprise a core layer underlying the skin layer and which comprises semi-crystalline homopolymer polyethylene terephthalate or amorphous polyethylene terephthalate copolymer or blends of the two. The core layer may optionally be modified by the addition of organic or inorganic particulates such as amorphous silica, calcium carbonate, clay, poly(dimethylsiloxane), glass beads or mixtures of two or more of the above to facilitate winding and handling of the film, or to enhance the mechanical and optical properties of the film, including reduction of the density of the film via cavitation. Furthermore a regrind of the film or of any other compatible film or resin may be included in the core layer to reduce material costs.

The films according to the invention may include an optional third layer, an anti-block layer underlying the skin layer and which is typically composed of homopolymer polyethylene terephthalate, copolymer polyethylene terephthalate or blends thereof that may or may not be modified with the addition of organic or inorganic particles such as, but not limited to, amorphous silica, calcium carbonate, clay, polydimethylsiloxane, glass beads or a mixture of two or more of these ingredients. The particulates modify the film surface to facilitate winding and handling of the film without having to put particulates in the core layer. The particulates in this layer are typically larger in diameter than the thickness of the skin layer and the third layer combined, thus providing these properties by protruding through the skin layer.

A preferred optional third layer consists essentially of polyethylene terephthalate homopolymer containing particles of silica having a mean particle size of about 2μ, or preferably blends of polyethylene terephthalate homopolymer and polyethylene terephthalate homopolymer containing particles of silica having a mean particle size of about 2μ at a suitable ratio, or more preferably a blend of 75% polyethylene terephthalate homopolymer and 25% polyethylene terephthalate homopolymer containing particles of silica having a mean particle size of about 2μ.

The optional third layer (Layer D) underlying said skin layer preferably has a thickness of about 0.5 to 30μ and is located between said skin layer and said core layer, The films may include an optional fourth layer underlying the core layer and comprising polyethylene terephthalate homopolymer, polyethylene terephthalate copolymer or blends thereof that may or may not be modified with the addition of organic or inorganic particulates such as amorphous silica, calcium carbonate, clay, polydimethylsiloxane, or glass beads or mixtures of two or more of these ingredients which modifies the film surface to facilitate winding and handling of the film.

A preferred fourth layer underlying the core layer consists essentially of polyethylene terephthalate homopolymer containing particles of silica having a mean particle size of about 2μ, or preferably blends of polyethylene terephthalate homopolymer and polyethylene terephthalate homopolymer containing particles of silica having a particle size of about 2μ at a suitable ratio, or more preferably a blend of 75% polyethylene terephthalate homopolymer and 25% polyethylene terephthalate homopolymer containing particles of silica having a mean particle size of about 2μ.

The optional fourth layer (Layer A) preferably underlies the core layer and has a thickness of about 0.5 to 30μ.

Any one or more of the layers of the peelable, sealable, co-extruded film may be modified with colored dyes or pigments such as but not limited to perinone, anthraquinone, titanium dioxide and carbon black or blends thereof to produce a colored film for decorative or functional purposes.

In the peelable, sealable co-extruded film any one or more of the layers may be modified with a UV absorber such as but not limited to benzophenone, benzotriazoles, benzoazinones, hindered amines, or triazines to protect the film or the contents of the package from degradation from UV energy.

The peelable, sealable co-extruded film may be modified so that the layer opposite the sealable, peelable skin layer face provides enhanced adhesion for inks, adhesives and other coatings by the use in said opposite layer of, but not limited to, an amorphous polyester resin such as an ethylene terephthalate copolymers prepared by the condensation of dimethyl terephthalate or terephthalic acid with one or more of the following: azelaic acid, dimethyl azelate, dimethyl sebacate, sebacic acid, isophthalic acid, 5-sodiumsulfoisophthalic acid, or by the condensation of dimethyl terephthalate or terephthalic acid with ethylene glycol, diethylene glycol and/or cyclohexanedimethyl glycol.

The peelable, sealable co-extruded film may be modified so that the face opposite the peelable, sealable skin layer provides enhanced adhesion for inks, adhesives and other coatings by the use of surface treatments such as but not limited to corona, flame or plasma, or coatings such as but not limited to acrylics, sulfonated polyesters, polyethylene imine or polyurethanes.

The peelable, sealable co-extruded film may be modified so that the face opposite the peelable, sealable skin layer is coated with, but not limited to, PVDC, PVOH, or nanocomposite suspensions; or vacuum deposited aluminum, aluminum oxide, or silicon oxide, to provide an improved barrier to water vapor, gas aroma, and light transmission through the film or other functional properties.

The peelable, sealable co-extruded film may be modified so that the layer opposite the peelable, sealable skin layer face includes particulate or other additives to provide a more glossy or matte finish to the film.

The basic structure of the film includes the heat-sealable or skin layer (Layer C) having a preferred thickness of about 0.1 to 10μ. The skin layer is capable of heat sealing against a rim of a container and adapted to be peeled therefrom. The basic structure of the film further includes the core layer (Layer B) having a preferred thickness of about 2 to 100μ underlying the skin layer and comprising crystalline homopolymer polyethylene terephthalate.

The peelable, sealable co-extruded films according to the present invention may be used to package any kind of frozen, refrigerated or other foods, including frozen or refrigerated dinners, entrees, pizzas and cakes, including cakes with frosting. In the case of packaging fatty foods such as pizzas which contain a cheese topping, dinners and entrees which contain cheese as well and cakes which may contain frosting, we have found it particularly advantageous to include within the skin layer a fatty amide lubricant which is capable of preventing the film from adhering to the adjacent fatty food during and after heating. The fatty amide lubricant added to the skin layer has been particularly effective to prevent cheese toppings, frosting and other fatty components of frozen food from adhering to the film when the film is removed following heating.

The co-extrusion process employed to prepare the peelable, sealable films may use either a feed block/single manifold die or a multi-manifold die to form the film. A preferred method of preparing the peelable, sealable co-extruded film comprises the following steps:

(a) co-extruding in a single step through a slot die a hot melt adhesive skin resin with a core resin comprising crystalline homopolymer polyethylene terephthalate to obtain an extruded layered sheet comprising an adhesive resin layer and a core layer comprising the crystalline homopolymer polyethylene terephthalate. Said homopolymer polyethylene terephthalate core resin is at a temperature above its crystalline melt temperature and the hot melt adhesive is at a temperature above the melt temperature of said hot melt adhesive resin, but below said melt temperature of said core resin at least part of the way through the die;

(b) cooling the extruded layered sheet to room temperature;

(c) preheating the extruded layered sheet cooled according to step (b) to a temperature above the glass transition temperature and below the crystal melt temperature of the homopolymer core layer;

(d) following step (c), stretching the extruded layered sheet in the machine direction 0 to 600% and cooling the extruded sheet to a temperature below 100° C.;

(e) heating the monoaxially stretched layers to a temperature above the glass transition temperature and below the crystalline melt temperature of the homopolymer core layer;

(f) following step (e), transversely stretching the heated film 0 to 600%;

(g) heat-setting the film from step (f) at a temperature above the glass transition temperature and below the crystalline melt temperature of the homopolymer core layer to optimize its tensile properties and its dimensional stability; and (h) trimming the film and winding up the film to obtained the desired product.

Additional layers, such as the optional third and fourth layers discussed hereinabove may be formed during step (a) in the single co-extrusion step as well.

The co-extrusion process used to prepare the new films offers the following advantages:

the process is cost effective because the film is produced in one manufacturing step as opposed to the prior art which produces a base film in one step and then coats the film in a second step; and no risk of solvents from the coating operation retained in the finished film.

The co-extruded film may be, but does not have to be biaxially oriented using any of a number of alternative processes known in the art, including sequential MD/TD or TD/MD stretching or simultaneous MD/TD stretching.

The temperatures required to stretch the homopolymer polyethylene terephthalate core layer are above the softening point of the skin layer. Thus the skin layer may stick to heated rolls or surfaces used to heat the film to orientation temperatures. To prevent this sticking behavior, one or more alternatives may be used:

use infrared heating only to raise the film to the desired temperature;

coat the heated rolls with Teflon or other release coating to prevent sticking;

use a hot air oven over an extended web length (drafting process);

use simultaneous MD/TD stretching where the film is supported only by the edges during the heating/stretching process;

coat the tenter clips with TEFLON or other release coating to prevent sticking; and use a skin layer that is narrower than the core layer to keep the skin layer out of the clips.

The preferred method is to use a sequential MD/TD orientation process by using heated rolls maintained at temperatures below the softening point of the skin layer, followed by infrared heating for the MD stretching process. The addition of particulate and fatty amide or other additives may be used to allow higher temperatures to be used on the heated rolls.

Furthermore the skin layer is preferably narrower than the core layer to prevent sticking to the tenter clips during the TD stretching process.

BRIEF DESCRIPTION OF THE DRAWINGS

The above and other objects, features, and advantages will become more readily apparent from the following description, reference being made to the accompanying drawings in which.

SPECIFIC DESCRIPTION

Figure 1:
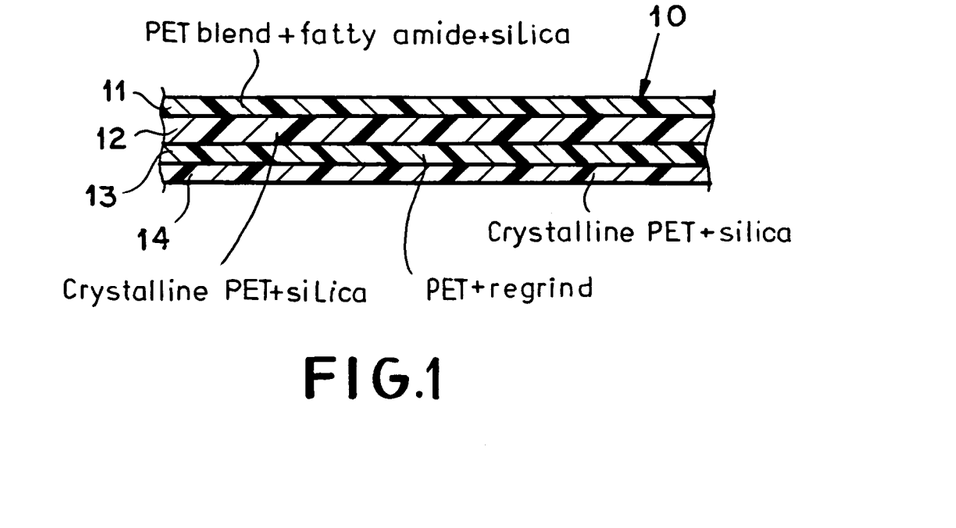
FIG. 1 is a cross sectional view through a multilayer film according to the invention.

In FIG. 1 there is shown a film 10 which comprises a heat sealing layer 11 which, in a preferred embodiment, is a PET copolymer blend with a fatty amide lubricant and silica, and a core or support structure which can consist of three layers including a layer 12 of virgin crystalline PET and silica, a layer 13 of virgin crystalline PET and regrind, and a layer 14 of virgin crystalline PET and silica.

Figure 2:
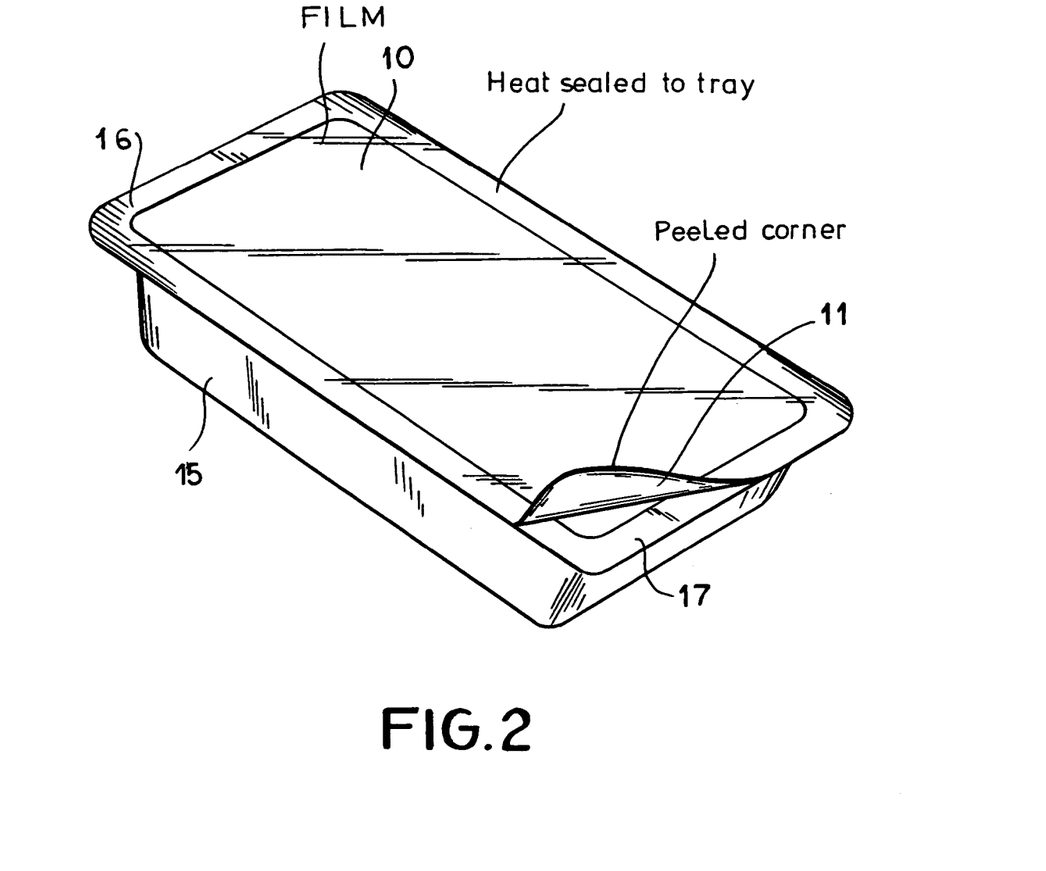
FIG. 2 is a perspective view showing the application thereof.

Referring to FIG. 2 the film 10 can be applied to a food tray 15 as shown at 16 with the layer 11 heat sealed to the rim 17 of the tray. Alternatively, that film can be used to directly wrap food products.

Figure 3:
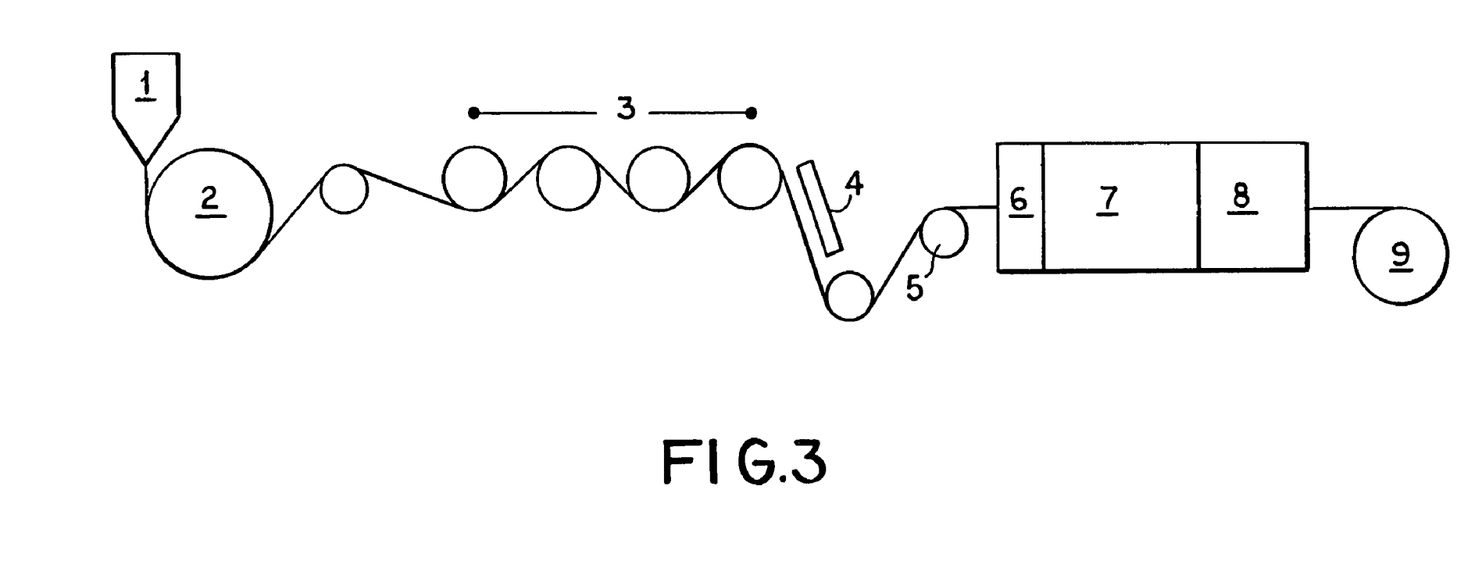
FIG. 3 is a side view diagrammatically illustrating a fabrication line for the film of the invention.
Figure 4:
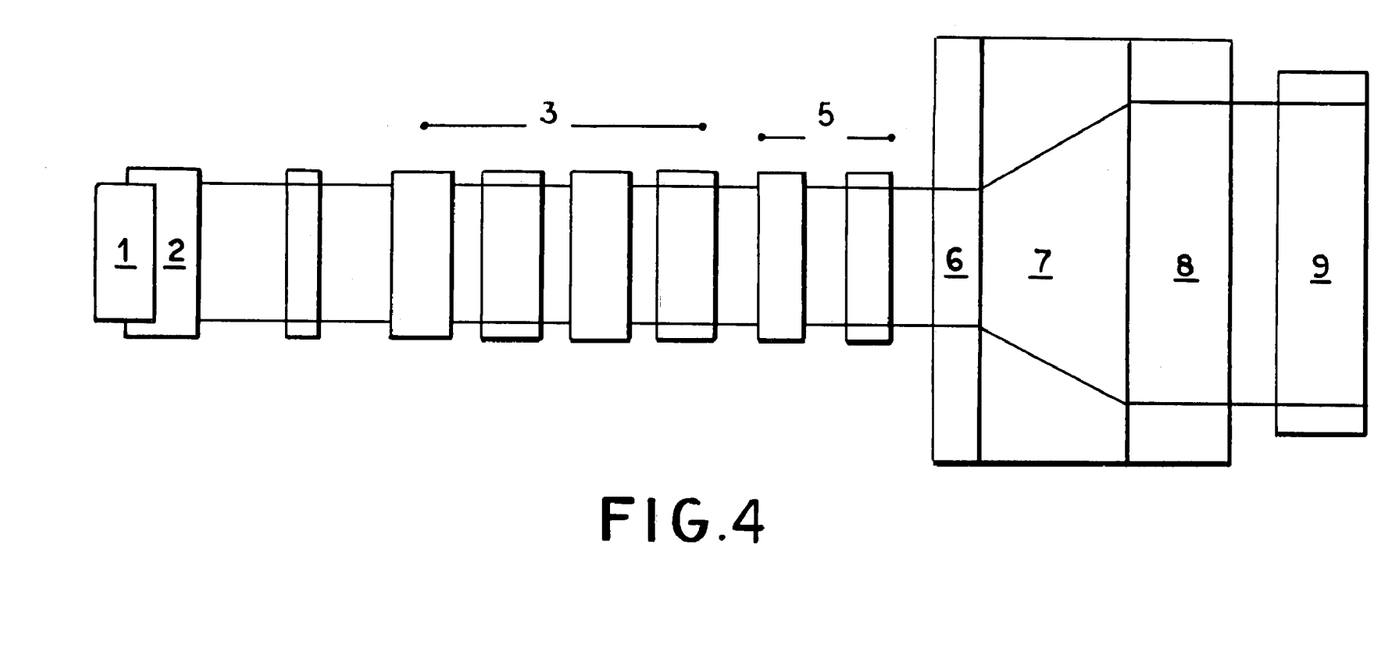
FIG. 4 is a diagrammatic plan view thereof.
Figure 5:
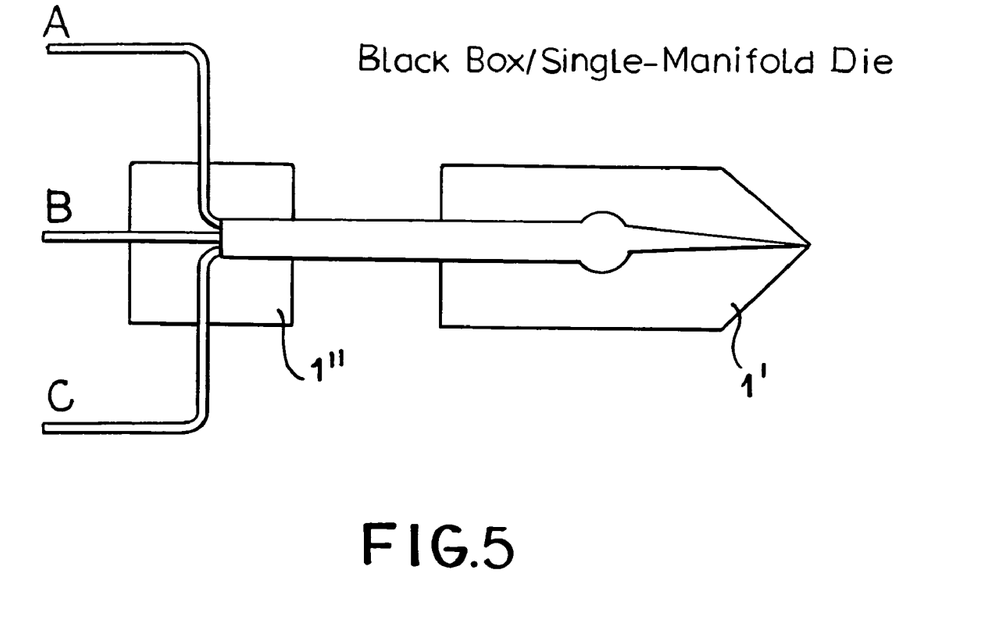
FIG. 5 is a diagrammatic cross sectional view illustrating a feed block/single manifold die for the production of the film.
Figure 6:
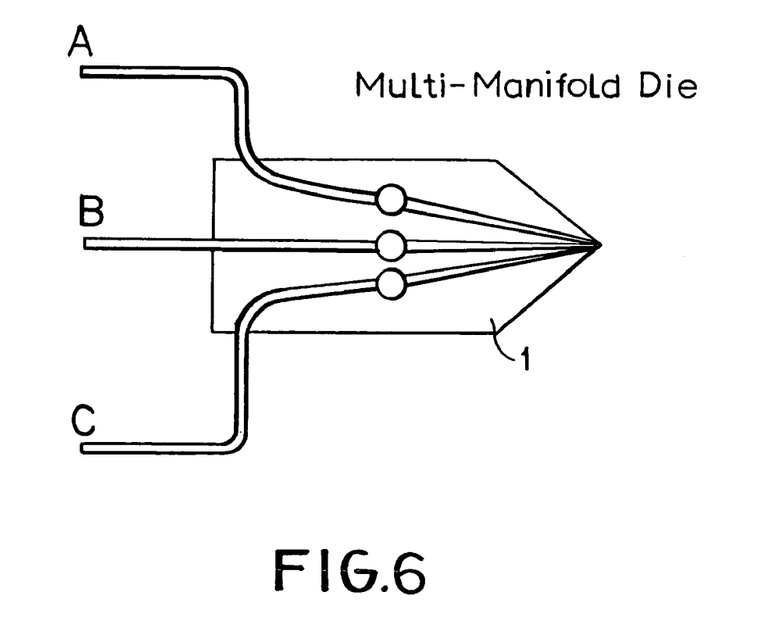
FIG. 6 is a view similar to FIG. 5 but showing a multi manifold die.

Referring to FIGS. 3 and 4, which show a tenter frame biaxial orientation process for PET film, the resins are co-extruded through the multi manifold die 1 in FIGS. 3 and 4 and as shown, for example, in FIG. 6 for a three layer film, or from a feed block/single layer die FIG. 5 at a temperature in excess of the melt temperature of the highest melt temperature polymer (i.e. the homopolymer PET core resin).

The extruded sheet is chilled to room temperature on the casting wheel 2. The film is preheated to a temperature above the glass transition temperature and below the crystal melt temperature of the homopolymer core layer using a series of heated rollers 3 and a bank of infrared heaters 4. The preheating rollers 3 rotate at the same speed as the casting wheel 2.

The film is stretched between the last preheating roller 3 and a first stretching roller 5 which runs at 1.5 to 4.5 times the surface speed of the preheating rollers. The stretching rollers 5 are cooled so as to cool the film to a temperature preferably below 100°C. The monoaxially stretched film is fed into a tenter chain within a multizone convection oven and traverses three zones 6 through 8 thereof. In the first zone 6 the monoaxially stretched film is heated to a temperature above the glass transition temperature and below the crystalline melt temperature of the homopolymer core layer. In the second zone 7 of the convection oven the film is stretched 200% to 600% in the transverse direction by the diverging tenter chain.

In the third zone 8 of the convection oven the film is heat set at a temperature above the glass transition temperature and below the crystalline melt temperature of the homopolymer core layer to optimize its tensile properties and its dimensional stability.

The unstretched edges of the film that were held in the clips of the tenter chain are trimmed off and the film is wound onto the roll 9.

In FIG. 6, the multi manifold die 1 is shown to receive 3 resins A, B and C, the resin A being the adhesive resin 11 and B being a homopolymer PET while C can be a further resin such as a mixture of PET and silica. In FIG. 5, the single manifold die 1' is used and a feedblock 1" receives the three layers A, B and C.

Thus, heat sealable films exist in the industry that utilize an amorphous polyethylene terephthalate copolymer heat seal layer co-extruded with a crystalline polyethylene terephthalate homopolymer core layer. The two polymers used are designed to run at similar operating temperatures in the extruders, melt lines and die—i.e. they have similar melt viscosities which allows laminar flow of the two polymers, which, in turn, is necessary for the production of a laminate uniform in appearance and physical properties. The advantage of this process for film-making is that it is a single-step operation, thus offering lower manufacturing costs. The disadvantage of this process is that the films produced to date do not have peelable seal properties that are essential to many packaging-lidding end use applications such as cook-in-the-package frozen entrees.

Heat sealable films also exist in the industry that utilize an amorphous polyethylene terephthalate copolymer (or other low-softening-point hot melt adhesive) heat seal layer that has been coated on a crystalline polyethylene terephthalate homopolymer film, utilizing any one of a number of methods including, but not limited to solvent coating, emulsion coating, slot die coating or extrusion coating. These processes allow the production of films with peelable-seal properties but have the disadvantage of being two-step processes: 1) manufacture of the homopolymer base film then 2) application of the heat seal coating.

The novelty of our invention is that we have co-extruded a low-softening-point hot melt adhesive heat seal layer with a crystalline polyethylene terephthalate homopolymer core layer. We maintained the laminar flow between the two polymers necessary to produce a laminate that is uniform in appearance and physical properties by running the heat seal layer at a melt temperature in its extruder and melt lines leading up to the feed block and die (or die alone, in the case of a multi-manifold die) below the crystalline melt temperature of the homopolymer core material. Prior art teaches that the two polymers need to be at or above the melt temperature of both polymers within the feed block and die when the two are co-extruded. Had we followed prior art, there would be a viscosity mismatch between the two polymer streams resulting in unacceptable non-laminar flow.

The following examples are directed to resin compositions that may be used in the present co-extrusion process to form the heat seal layer or skin layer:

EXAMPLE 1

| | |
|---|---|
| 100 parts | Vitel 1912 |
| 1 part | Behenamide |
| 1 part | stearyl erucamide |
| 1 part | 2μ mean particle size amorphous silica |

EXAMPLE 2

| | |
|---|---|
| 100 parts | Vitel 1912 |
| 2 parts | Stearyl erucamide |
| 1 part | 2μ mean particle size amorphous silica. |

Because the low melting point Behenamide has been eliminated, this formulation has the advantages of lower levels of volatiles at the die, less odor at the die and throughout the production area, and less contamination of equipment in the area with condensed volatiles. It has maintained desirably low COF properties and blocking resistance during processing.

EXAMPLE 3

| | |
|---|---|
| 100 parts | Vitel 1912 |
| 1 part | Behenamide |
| 1 part | Stearyl erucamide |
| 1 part | 5μ mean particle size amorphous silica (Sylobloc 47 from W.R. Grace & Co./Davison Chemical Division) |

This formulation provided the desired low COF and blocking resistance, but was suspected of causing melt filter plugging problems with the fine filters we were using. We have since changed to coarser filters for this product.

EXAMPLE 4

| | |
|---|---|
| 100 parts | Vitel 1912 |
| 5 parts | Polyethylene wax (CWP 500 from Hase Petroleum Wax Co.) |
| 1 part | 2μ mean particle size amorphous silica |

EXAMPLE 5

| | |
|---|---|
| 100 parts | Vitel 1912 |
| 0.1 part | Silicone Oil (0.22 parts MB50 masterbatch from Dow Corning) |
| 1 part | 2μ mean particle size amorphous silica |

EXAMPLE 6

| | |
|---|---|
| 100 parts | Vitel 1912 |
| 2 parts | Stearyl erucamide |
| 2 parts | 2μ mean particle size kaolinite |

EXAMPLE 7

| | |
|---|---|
| 100 parts | Vitel 1912 |
| 2 parts | Stearyl erucamide |
| 2 parts | 2µ mean particle size glass microspheres |

Other formulations, utilizing blends of other fatty amides or fatty amides with wax and a particulate such as silica, clay or glass microspheres are also within the scope of the invention. Furthermore formulations with a lubricant or lubricant blend alone without the particulates as well as formulations with the particulates but without the lubricants are also within the scope of the invention.

EXAMPLE 8

The hot melt adhesive resin composition of example 1 (C-layer) is extruded through a 2½" 30:1 single screw extruder with set temperatures on the extruder barrel of 200° C. Simultaneously, a dry blend of 65% virgin PET homopolymer and 35% film regrind (B-layer) is extruded through a 4½" 30:1 single screw extruder with set temperatures on the extruder barrel of 280° C. and a dry blend of 75% virgin PET homopolymer and 25% virgin PET homopolymer containing 5000 ppm silica with a 2 micron mean particle size (A-layer) is extruded through a 3½" 30:1 single screw extruder with set temperatures on the extruder barrel of 280° C. The three melt streams are fed to a WELEX CABA four-layer feedblock followed by an EDI coat hanger die to provide a 6 mil thick laminate. The laminate is quenched to room temperature on a polished chrome casting wheel. The thickness of the laminate is a nominal 155 microns and the C-layer is 10% of the total laminate thickness.

The laminate is heated to a temperature above the glass transition temperature and below the crystalline melt temperature of the homopolymer layers using a series of heated rollers and a bank of infrared heaters, then stretched 340% in the machine direction between a pair of rollers, the first turning at the same surface speed as the casting wheel and the second turning at a surface speed 3.4 times faster. The resulting stretched laminate is chilled to room temperature and fed into a tenter chain running in a convection oven.

In the first zone of the oven the laminate is again heated to a temperature above the glass transition temperature and below the crystalline melt temperature of the homopolymer layers before passing into the second zone of the oven.

In the second zone of the oven, the laminate is stretched by the tenter chain 3.5 times in the transverse or cross-machine direction before passing into the third zone of the oven.

In the third zone of the oven, the laminate is heat set at a temperature above the glass transition temperature and below the crystalline melt temperature of the homopolymer layers to optimize its mechanical properties.

The heat set laminate is then cooled to room temperature, the unstretched edges that were held in the tenter clips are trimmed off and the trimmed laminate is wound onto a roll. The wound laminate is now a nominal 13.5-micron thickness.

The resulting film is slit to width for use as the bottom layer of a pillow package for frozen pizza. The film is heat sealed to a homopolymer polyester film top layer of the pillow package as the two films encase a frozen pizza on a form-fill-seal packaging machine. The set temperature of the heat sealers is 125° C. Twelve overwrapped pizzas are loaded into a corrugated box for shipping in the frozen state to institutional kitchens such as school cafeterias.

At the kitchen, the frozen overwrapped pizzas are placed in metal baking pans, and the top film is peeled off and discarded. The bottom film (the film of this invention) is left under the pizza in the pan to keep the pan clean during and after cooking. The pizza is cooked in a convection oven about 14 minutes at 200° C. After cooking the pizza can be removed from the bottom film (of this invention) without any sticking of the cheese or sauce to the film.

COMPARATIVE EXAMPLE 9

A laminate is prepared according to the method of example 8 except that the C-layer is an isophthalic/terephthalic copolymer polyester resin blend that does not contain the fatty amides. This laminate does not seal as readily to the homopolymer top film of the pillow package and sticks severely to the cheese topping of the pizza after cooking, removing large portions of cheese and making the pizza unsuitable for consumption.

COMPARATIVE EXAMPLE 10

The laminates from examples 8 and 9 above are heat sealed, using a laboratory heat sealer, to 1" wide strips cut from the bottom of impact-modified CPET typical of those used for containing frozen entrees (supplied by APT) for two seconds at 24 psi at a variety of temperatures. As can be seen in the attached table, the laminate representative of this invention seals to the CPET tray stock over a broad range of temperatures and provides a peelable seal while the laminate of comparative example 9 does not seal readily to the CPET tray stock and when it does provides a film-tear seal. The broad range of sealing temperatures is tray-filling/lidding equipment. The peelable seal is desirable for easy and clean removal of the lidding film by the consumer, during preparation of the entré.

| Sealer Set Temperature (° C.) | Film from this Invention | | Comparative Example 9 Film | |
|---|---|---|---|---|
| | Seal Strength | Failure Mode | Seal Strength | Failure Mode |
| 110 | 247 | Peel | 0 | — |
| 130 | 242 | Peel | 0 | — |
| 150 | 286 | Peel | 76 | Peel |
| 170 | 376 | Peel | 236 | Peel |
| 190 | 391 | Peel | 225 | Peel |
| 210 | 548 | Peel | 535 | Tear |
| 230 | 671 | Peel | 688 | Tear |

What is claimed is:

1. A peelable sealable co-extruded film, comprising:
   i. a skin layer capable of heat sealing against a rim of a container, to itself, or to another film and adapted to be peeled therefrom and comprising a hot melt adhesive resin;
   ii. a core layer underlying said skin layer and comprising crystalline homopolymer or copolymer polyethylene terephthalate or blends thereof; and
   iii. a third layer underlying said skin layer and located between said skin layer and said core layer, said third layer comprising polyethylene terephthalate homopolymer with particulates wherein the size of the particulates is larger in diameter than the thickness of the skin layer and the third layer combined thus protruding through the skin layer to facilitate winding and handling of the film.

2. The peelable, sealable co-extruded film defined in claim 1 wherein the hot melt adhesive resin is a hot melt polymer selected from the group consisting of an amorphous polyethylene terephthalate copolymer blend, an ethylene polyvinyl acetate copolymer blend and polyethylene homopolymer and copolymer blends, and cyclic olefin copolymers and blends.

3. The peelable, sealable co-extruded film defined in claim 1 wherein the skin layer further comprises: at least 0.01% by weight of at least one lubricant selected from the group which consists of fatty amides, natural and synthetic waxes and silicone oils, and at least one particulate substance selected from the group which consists of amorphous silica, clay, glass microspheres, silicone microspheres, calcium carbonate and polymers incompatible with polyethylene terephthalate.

4. The peelable, sealable co-extruded film defined in claim 3 wherein the particulate substance within the skin layer has a particle size of 0.1 to 6μ.

5. The peelable, sealable co-extruded film defined in claim 3 wherein the skin layer consists essentially of 100 parts of amorphous polyethylene terephthalate copolymer blend, 1 part of behenamide and 1 part of stearyl erucamide as the lubricant compounds and 1 part of amorphous silica of a mean particle size of 2μ as the particulate substance.

6. The peelable, sealable co-extruded film defined in claim 3 wherein the lubricant in the skin layer is a fatty amide capable of preventing the film during heating from adhering to an adjacent fatty food.

7. The peelable, sealable co-extruded film defined in claim 6 wherein the fatty amide is behenamide, stearamide, erucamide, stearyl erucamide, other bisamides or mixtures thereof and the fatty food is cheese or frosting.

8. The peelable, sealable co-extruded film defined in claim 1 further comprising:
   iv. a fourth layer underlying the core layer and comprising polyethylene terephthalate homopolymer with particulates which modifies the film surface to facilitate winding and handling of the film.

9. The peelable, sealable co-extruded film defined in claim 8 wherein the fourth layer underlying the core layer has a thickness of about 0.5 to 30μ.

10. The peelable, sealable co-extruded film defined in claim 8 wherein the fourth layer underlying the core layer consists essentially of polyethylene terephthalate homopolymer containing particles of silica having a particle size of about 2μ, or blends of polyethylene terephthalate homopolymer and polyethylene terephthalate homopolymer containing particles of silica having a particle size of about 2μ at a suitable ratio, or a blend of 60% polyethylene terephthalate homopolymer and 40% polyethylene terephthalate homopolymer containing particles of silica having a particle size of about 2μ.

11. The peelable, sealable co-extruded film defined in claim 1 wherein the skin layer has a thickness of 0.005 to 10μ.

12. The peelable, sealable co-extruded film defined in claim 1 wherein the core layer has a thickness of about 5 to 50μ.

13. The peelable, sealable co-extruded film defined in claim 1 wherein the core layer has a thickness of about 6.5 to 48.5μ.

14. The peelable, sealable co-extruded film defined in claim 1 wherein the third layer underlying the skin layer has a thickness of about 0.5 to 30μ.

15. The peelable, sealable co-extruded film defined in claim 1 wherein the third layer underlying the skin layer consists essentially of polyethylene terephthalate homopolymer containing particles of silica having a particle size of about 2μ, or blends of polyethylene terephthalate homopolymer and polyethylene terephthalate homopolymer containing particles of silica having a particle size of about 2μ at a suitable ratio, or a blend of 60% polyethylene terephthalate homopolymer and 40% polyethylene terephthalate homopolymer containing particles of silica having a particle size of about 2μ.

16. The peelable, sealable co-extruded film defined in claim 1 wherein the thickness of the skin layer is narrower than the thickness of the core layer.

17. The peelable, sealable co-extruded film defined in claim 16 wherein the thickness of the skin layer is about 0.005 to 1.5μ and the thickness of the core layer is about 6 to 50μ.

18. The peelable, sealable co-extruded film defined in claim 1 wherein any one or more of the layers are modified with colored dyes or pigments to produce a colored film for decorative or functional purposes.

19. The peelable, sealable co-extruded film defined in claim 1 wherein any one or more of the layers are modified with a UV absorber to protect the film or the contents of the package from degradation from UV energy.

20. The peelable, sealable co-extruded film defined in claim 1 wherein the layer opposite the sealable, peelable skin layer face is modified to provide enhanced adhesion for inks, adhesives and other coatings by the use of, an amorphous polyester resin.

21. The peelable, sealable co-extruded film defined in claim 1 wherein the face opposite the sealable peelable skin layer is modified to provide enhanced adhesion for inks, adhesives and other coatings by the use of surface treatments.

22. The peelable, sealable co-extruded film defined in claim 1 wherein the face opposite the sealable peelable skin layer is coated with, PVDC, PVOH, vacuum deposited aluminum, aluminum oxide, silicon oxide, nanocomposite suspensions, poly(dimethyl siloxane) to provide improved barrier to water vapor, gas aroma, and light transmission through the film or other functional properties.

23. The peelable, sealable co-extruded film defined in claim 1 wherein the layer opposite the sealable, peelable skin layer face is modified particulate or other additives to provide a more glossy or matte finish to the film.

24. A peelable sealable co-extruded film, comprising:
   i. a skin layer capable of heat sealing against a rim of a container, to itself, or to another film and adapted to be peeled therefrom and wherein the skin layer consists essentially of 100 parts of amorphous polyethylene terephthalate copolymer blend, 1 part of behenamide and 1 part of stearyl erucamide as lubricant compounds, and 1 part of amorphous silica of a mean particle size of 2μ as a particulate substance; and
   ii. a core layer underlying said skin layer and comprising crystalline homopolymer or copolymer polyethylene terephthalate or blends thereof.

* * * * *